US006467033B2

(12) United States Patent
Allison et al.

(10) Patent No.: US 6,467,033 B2
(45) Date of Patent: Oct. 15, 2002

(54) METHOD AND APPARATUS FOR IMPLEMENTING LOCKING OF NON-DATA PAGE OPERATIONS

(75) Inventors: Brian David Allison; Scott D. Clark; Joseph A. Kirscht, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 09/735,411

(22) Filed: Dec. 12, 2000

(65) Prior Publication Data

US 2002/0073287 A1 Jun. 13, 2002

(51) Int. Cl.$^7$ .............................................. G06F 12/00
(52) U.S. Cl. ........................ 711/159; 711/154; 711/206
(58) Field of Search ............................ 711/100, 154, 711/159, 163, 206, 207

(56) References Cited

U.S. PATENT DOCUMENTS 5,276,848 A * 1/1994 Gallagher et al. .......... 711/121
5,790,804 A * 8/1998 Osborne ...................... 709/245
6,076,157 A * 6/2000 Borkenhagen et al. ...... 712/228
6,161,208 A * 12/2000 Dutton et al. ............... 714/764
6,212,544 B1 * 4/2001 Borkenhagen et al. ...... 709/103
6,385,694 B1 * 5/2002 Arimilli et al. ............. 711/118
6,397,300 B1 * 5/2002 Arimilli et al. ............. 711/138

* cited by examiner

Primary Examiner—Tuan V. Thai
(74) Attorney, Agent, or Firm—Joan Pennington

(57) ABSTRACT

A method and apparatus are provided for implementing locking of non-data page operations in a memory system. In the method for implementing locking of non-data page operations of the invention, checking for a look aside buffer invalidate request is performed. Responsive to identifying a look aside buffer invalidate request, a real address is locked for the look aside buffer invalidate request. Then checking for a non-data page operation is performed. Responsive to identifying a non-data page operation, checking for the non-data page operation to complete is performed. Responsive to identifying the completed non-data page operation, the real address is unlocked for the look aside buffer invalidate request. Only a lock is placed on the page for a non-data page operation. A look aside buffer invalidate sequence is not performed for the non-data page operation.

13 Claims, 5 Drawing Sheets

COMPRESSION TRANSLATE TABLE ENTRY (CTTE) 130

| 127 | 120 | 119 | 112 | 111 | 104 | 103 | 96 | 95 | 88 | 87 | 80 | 79 | 72 | 71 | 64 |
|---|---|---|---|---|---|---|---|---|---|---|---|---|---|---|---|
| PAGE FLAGS | | POINTER 0 | | | | | | POINTER 1 | | | | | | | |

| 63 | 56 | 55 | 48 | 47 | 40 | 39 | 32 | 31 | 24 | 23 | 16 | 15 | 8 | 7 | 0 |
|---|---|---|---|---|---|---|---|---|---|---|---|---|---|---|---|
| POINTER 1 | | POINTER 2 | | | | | | POINTER 3 | | | | | | | |

FIG. 1B

METHOD AND APPARATUS FOR IMPLEMENTING LOCKING OF NON-DATA PAGE OPERATIONS

FIELD OF THE INVENTION

The present invention relates generally to the data processing field, and more particularly, relates to a method and apparatus for implementing locking of non-data page operations in a memory system.

DESCRIPTION OF THE RELATED ART

In a memory system it is desirable to minimize memory latency and to provide improved efficient performance.

One known memory system includes a compressed data structure utilizing indirect addressing and a mechanism of manipulating data in system memory at a page level by manipulating translation table entries. These manipulations involve such operations as copies, moves, clears, and the like. In this compressed memory system, a fetch of a translate table entry must be made in order to access the requested data. These entries may be kept in a look aside buffer to prevent refetching for future accesses to the same page. When an entry in a look aside buffer has been invalidated by a page operation (op) future processor or I/O accesses to that same page requires performing a new memory fetch of the compression translate table entry.

A need exists for a method and apparatus to minimize memory latency and to provide improved efficient performance. It is desirable to provide a method and apparatus for implementing locking of non-data page operations in a memory system. It is desirable to provide such a method and apparatus for implementing locking of non-data page operations that provides improved efficient performance and that minimizes memory latency.

SUMMARY OF THE INVENTION

Important objects of the present invention are to provide an improved method and apparatus for implementing locking of non-data page operations in a memory system, to provide such apparatus and method substantially without negative effects and that overcome many disadvantages of prior art arrangements.

In brief, a method and apparatus are provided for implementing locking of non-data page operations in a memory system. In the method for implementing locking of non-data page operations of the invention, checking for a look aside buffer invalidate request is performed. Responsive to identifying a look aside buffer invalidate request, a real address is locked for the look aside buffer invalidate request. Then checking for a non-data page operation is performed. Responsive to identifying a non-data page operation, checking for the non-data page operation to complete is performed. Responsive to identifying the completed non-data page operation, the real address is unlocked for the look aside buffer invalidate request.

In accordance with features of the invention, only a lock is placed on the page for a non-data page operation. A look aside buffer invalidate sequence is not performed for the non-data page operation.

BRIEF DESCRIPTION OF THE DRAWINGS

The present invention together with the above and other objects and advantages may best be understood from the following detailed description of the preferred embodiments of the invention illustrated in the drawings, wherein:

FIG. 1B is a diagram illustrating an exemplary compression translate table entry (CTTE) in accordance with the preferred embodiment;

DETAILED DESCRIPTION OF THE PREFERRED EMBODIMENTS

Figure 1A:
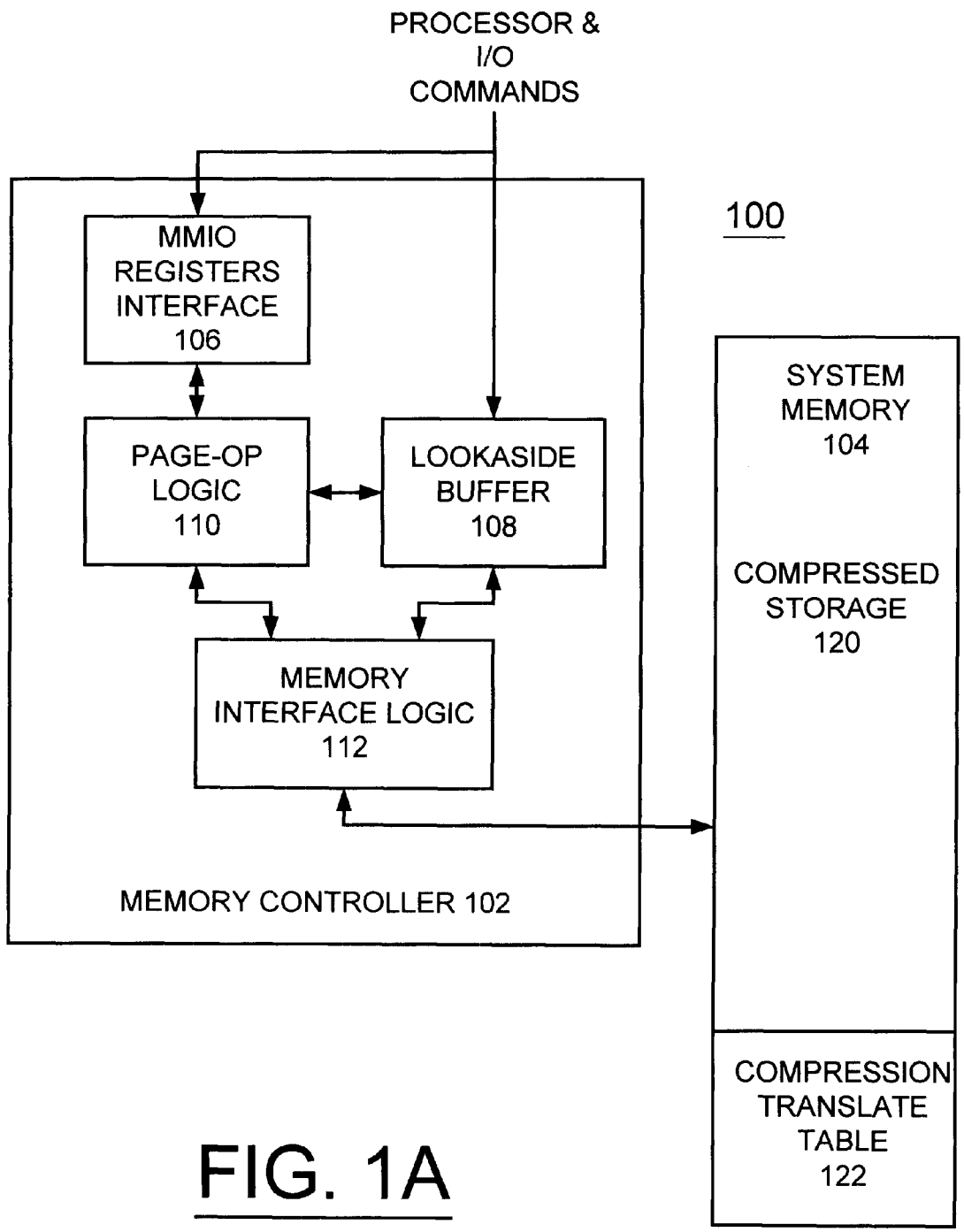
FIG. 1A is a block diagram representation illustrating a memory system for implementing methods for implementing locking of non-data page operations in accordance with the preferred embodiment.

Having reference now to the drawings, in FIG. 1A, there is shown a memory system of the preferred embodiment generally designated by the reference character 100. As shown in FIG. 1A, memory system 100 includes a memory controller generally designated by 102, and a system memory 104. Memory controller 102 includes an internal memory mapped input/output (MMIO) register interface 106. In memory system 100, where the system memory 104 includes a compressed data structure there exists a mechanism of manipulating data in system memory 104 at a page level. These manipulations include such operations as copies, moves, clears, and the like. Page manipulation of the preferred embodiment is initiated though the MMIO register interface 106. Memory controller 102 includes an internal look aside buffer 108 receiving processor and I/O commands destined to the system memory 104. Look aside buffer 108 is coupled to a page-op logic 110 and a memory interface logic 112. MMIO register interface 106 is coupled to the memory interface logic 112 via the page-op logic 110. The look aside buffer 108 within the memory controller 102 of recently used entries of the translate table 122 is provided to reduce average latency for a memory access.

System memory 104 includes a compressed storage 120, and a compression translate table (CTT) 122. The compression translate table 122 is located in any location within system memory 104. The size of the compression translate table 122 is determined by the amount of real address space configured in the system. The compression translate table 122 residing in system memory 104 is used to map a real address into compressed physical memory sectors.

Referring also to FIG. 1B, a compression translate table entry generally designated by 130 is shown. FIG. 1B illustrates an exemplary compression translate table entry (CTTE) 130. Compression translate table entry (CTTE) contains four sector pointers that are used to indicate the location in physical memory that make up the compressed view of the corresponding compression block. Entries in the compression translate table 122, contain a set of flags used to save characteristics of a given page to be used for the management of the compressed memory 120.

During a page operation or page op initiation that manipulates page data a request is made to invalidate the corresponding look aside buffer entry. A lock is then placed on the page that is being manipulated such that an incoming op either from a processor or I/O is stalled from going to system memory 104 until the page op has been completed in order to prevent simultaneous operations from altering the same entry. Also during this same page op sequence, if there is an entry in the look aside buffer 108 that matches the real address of the page that is being manipulated, the entry in the look aside buffer 108 is invalidated since the pointer within the particular compression translate table entry 130 will be altered.

In accordance with features of the preferred embodiment, page operations that manipulate only the flags of a designated page and not the actual data contained within that page are identified. In this case, the page is not invalidated in the look aside buffer 108 if there is a match and only a page lock is performed. This is advantageous because if the entry was in the look aside buffer 108 to begin with when the page operation was initiated, this page is one that was recently addressed. The longer an entry is kept in the look aside buffer 108 the more likely a future access to a given page can receive a match thus reducing latency for a memory access. If the entry had been invalidated by the page op as conventionally done, future processor or I/O access to that same page would need to perform a memory fetch of the particular compression translate table entry 130. For non-data page op, the page is not invalidated in the look aside buffer 108 if there is a match and only the page is locked, reducing contention vying for look aside buffer 108. A locking only page op does not vie to gain access to the look aside buffer 108. This leaves more bandwidth for processor or I/O resource allocation into the look aside buffer 108. Also the number of cycles to perform a non-data page op is reduced, because a look aside buffer invalidate does not need to be performed. Reducing the number of cycles for the non-data page op, effectively increases processor and I/O bandwidths, preventing any unnecessary cycles of stalling processor or I/O accesses to that same page.

Figure 2A:
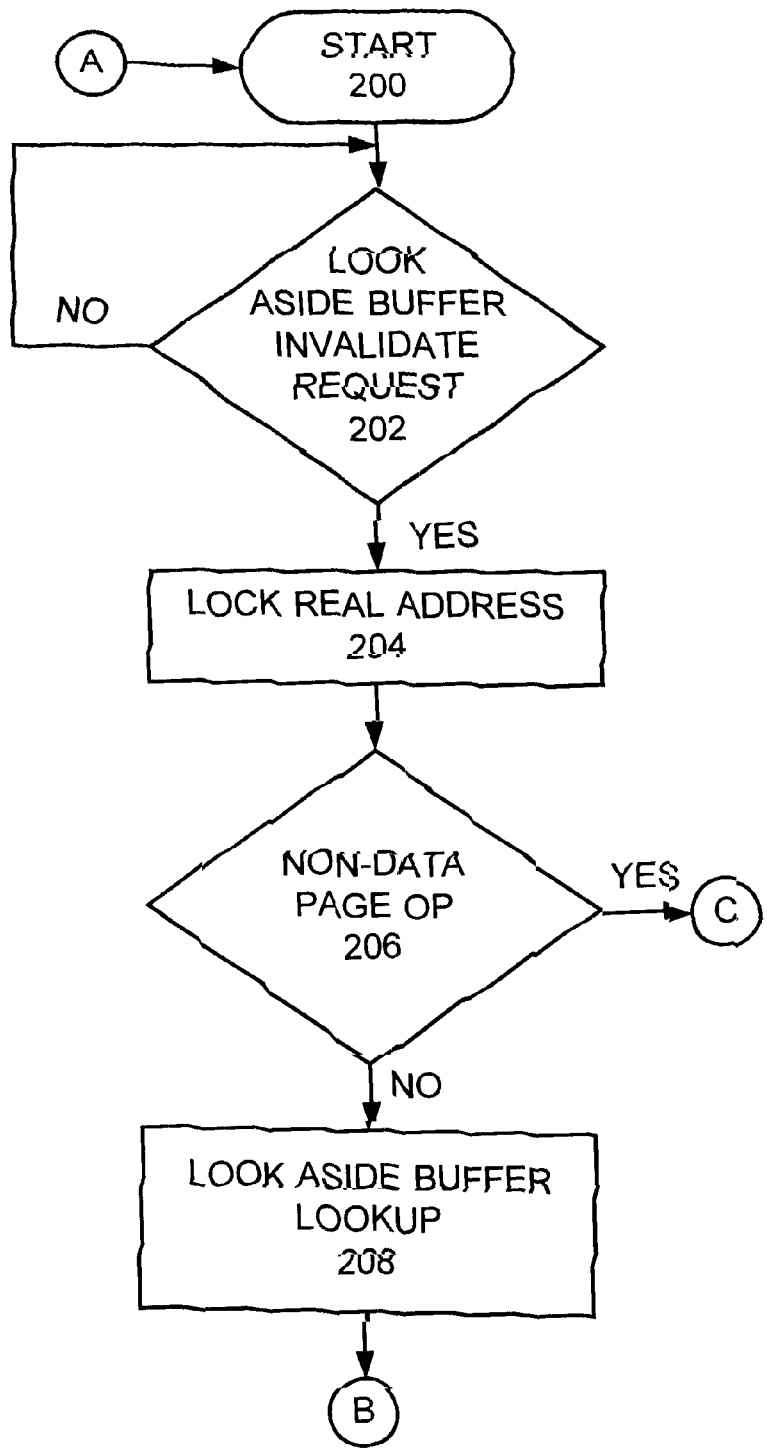
FIGS. 2A and 2B are flow charts illustrating exemplary sequential steps for implementing locking of non-data page operations in accordance with the preferred embodiment.
Figure 2B:
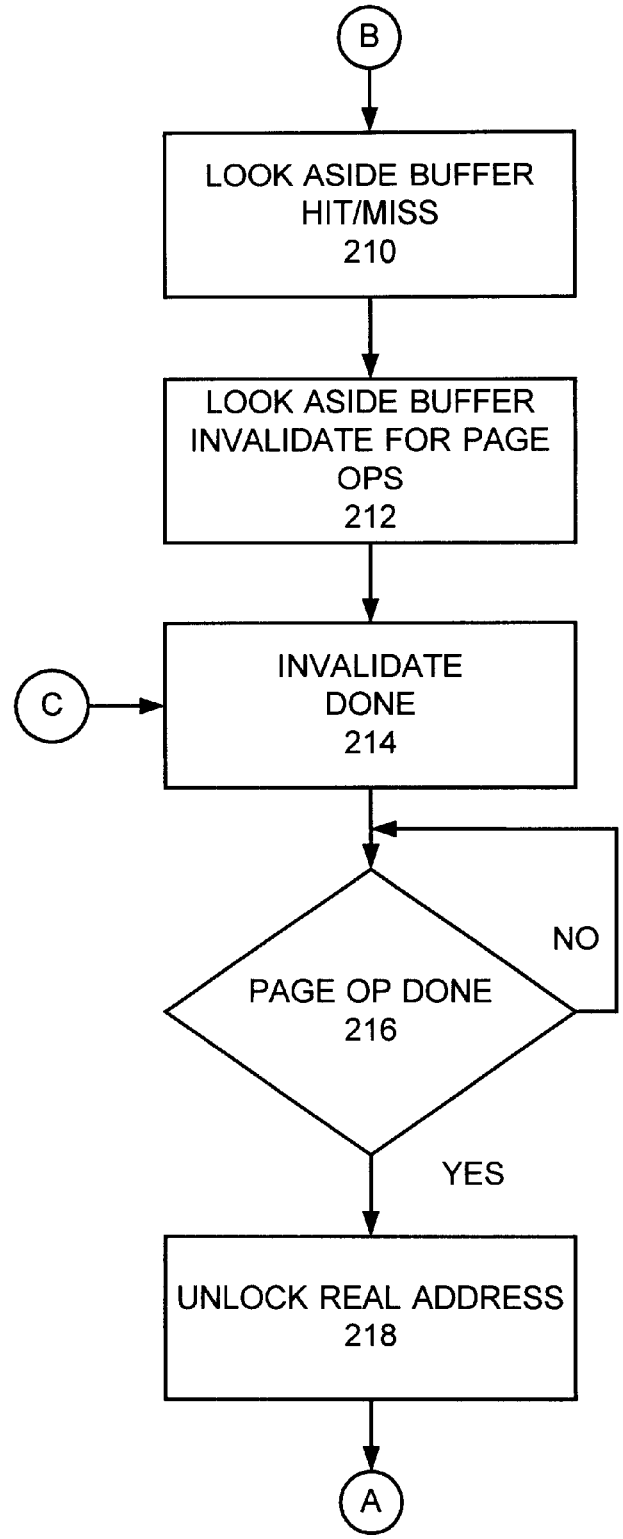

Referring to FIGS. 2A and 2B, there are shown exemplary sequential steps for implementing locking of non-data page operations in accordance with the preferred embodiment starting at a block 200. Checking for a look aside buffer invalidate request from the page op logic 110 is performed as indicated in a decision block 202. Responsive to identifying a look aside buffer invalidate request, a real address for the invalidate request is locked as indicated in a block 204. Checking whether the invalidate request is for non-data page op is performed as indicated in a decision block 206. If a non-data page op is not identified, then a look aside buffer lookup is performed as indicated in a block 208. Then the sequential operations continue following entry point B in FIG. 2B.

Referring to FIG. 2B following entry point B, a look aside buffer hit or miss is identified as indicated in a block 210. The look aside buffer is invalidated for the data page op as indicated in a block 212 and the invalidate is done as indicated in a block 214. When the invalidate is done and when a non-data page op is identified at block 206 in FIG. 2A, then checking whether the page op is done is performed as indicated in a decision block 216. Responsive to identifying the page op done, the real address is unlocked as indicated in a block 218. Then the sequential operations continue following entry point A in FIG. 2A.

Figure 3:
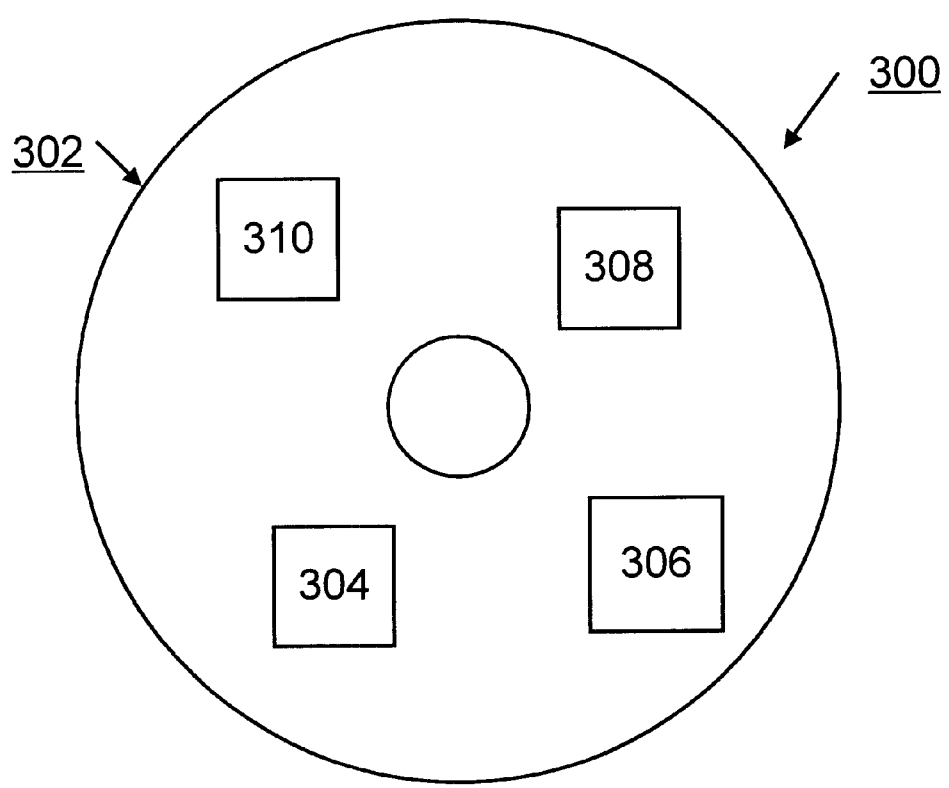
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing locking of non-data page operations of the preferred embodiment in the system 100 of FIG. 1A.

A sequence of program instructions or a logical assembly of one or more interrelated modules defined by the recorded program means 304, 306, 308, 310, direct the memory system 100 for implementing locking of non-data page operations of the preferred embodiment.

While the present invention has been described with reference to the details of the embodiments of the invention shown in the drawing, these details are not intended to limit the scope of the invention as claimed in the appended claims.

What is claimed is:

1. A method for implementing locking of non-data page operations in a memory system comprising the steps of:

identifying a look aside buffer invalidate request;

responsive to identifying a look aside buffer invalidate request, locking a real address for said look aside buffer invalidate request;

checking for a non-data page operation;

responsive to identifying said non-data page operation, checking for said non-data page operation to complete; and responsive to identifying said completed non-data page operation, unlocking said real address for said look aside buffer invalidate request.

2. A method for implementing locking of non-data page operations as recited in claim 1 further includes the step of identifying a data page operation.

3. A method for implementing locking of non-data page operations as recited in claim 2 further includes the step of invalidating said data page operation for said look aside buffer invalidate request.

4. A method for implementing locking of non-data page operations as recited in claim 3 wherein the step of invalidating said data page operation for said look aside buffer invalidate request includes the step of performing a look aside buffer lookup for said look aside buffer invalidate request.

5. A method for implementing locking of non-data page operations as recited in claim 4 wherein the step of performing a look aside buffer lookup for said look aside buffer invalidate request includes the step of identifying a look aside buffer hit or miss for said look aside buffer invalidate request.

6. A method for implementing locking of non-data page operations as recited in claim 1 wherein the step of identifying said non-data page operation includes the step of identifying a page operation for manipulating at least one flag of a designated page and wherein data contained within said designated page is not manipulated.

7. A computer program product for implementing locking of non-data page operations in a memory system including a memory controller, said computer program product including a plurality of computer executable instructions stored on a computer readable medium, wherein said instructions, when executed by said memory controller, cause the memory controller to perform the steps of:

identifying a look aside buffer invalidate request;

responsive to identifying a look aside buffer invalidate request, locking a real address for said look aside buffer invalidate request;

checking for a non-data page operation;

responsive to identifying said non-data page operation, checking for said non-data page operation to complete; and responsive to identifying said non-data page operation completed, unlocking said real address for said look aside buffer invalidate request.

8. A computer program product for implementing locking of non-data page operations in a memory system as recited in claim 7 further includes the step of identifying a data page operation and invalidating said data page operation for said look aside buffer invalidate request.

9. A computer program product for implementing locking of non-data page operations in a memory system as recited in claim 7 wherein the step of responsive to identifying said non-data page operation, checking for said non-data page operation to complete is performed without invalidating said non-data page operation for said look aside buffer invalidate request.

10. Apparatus for implementing locking of non-data page operations in a memory system comprising:

a system memory for storing data and a compression translate table; said compression translate table for mapping a real address into a physical address;

a memory controller coupled to said system memory; said memory controller including a look aside buffer for receiving processor and input/output (I/O) commands; a memory mapped I/O (MMIO) for initiating page manipulations; and a memory interface logic coupled between said system memory and both said look aside buffer and said MMIO; said memory controller for performing the steps of:

identifying a look aside buffer invalidate request;

responsive to identifying a look aside buffer invalidate request, locking a real address for said look aside buffer invalidate request;

checking for a non-data page operation;

responsive to identifying said non-data page operation, checking for said non-data page operation to complete; and responsive to identifying said non-data page operation completed, unlocking said real address for said look aside buffer invalidate request.

11. Apparatus for implementing locking of non-data page operations in a memory system as recited in claim 10 wherein said memory controller for performing the steps of identifying a data page operation and invalidating said data page operation for said look aside buffer invalidate request.

12. Apparatus for implementing locking of non-data page operations in a memory system as recited in claim 10 wherein the step of identifying said non-data page operation includes the step of identifying a page operation for manipulating at least one flag of a designated page and wherein data contained within said designated page is not manipulated.

13. Apparatus for implementing locking of non-data page operations in a memory system as recited in claim 10 wherein the step of responsive to identifying said non-data page operation, checking for said non-data page operation to complete is performed without invalidating said non-data page operation for said look aside buffer invalidate request.

* * * * *